United States Patent [19]

Levin

[11] Patent Number: 4,813,093
[45] Date of Patent: Mar. 21, 1989

[54] METHOD OF MANUFACTURING A CVD TORCH

[75] Inventor: Philip S. Levin, West Willington, Conn.

[73] Assignee: SpecTran Corporation, Sturbridge, Mass.

[21] Appl. No.: 110,397

[22] Filed: Oct. 20, 1987

[51] Int. Cl.[4] .............................................. B21K 29/00
[52] U.S. Cl. .................................... 29/157 C; 29/530
[58] Field of Search ................. 29/157 R, 157 C, 530; 239/338, 418, 424, 135, 425, 124, 424.5, 427.5

*Primary Examiner*—Timothy V. Eley
*Attorney, Agent, or Firm*—Pennie & Edmonds

[57] ABSTRACT

An improved torch for the mixing of oxidant and fuel gases external to the torch, for exampled for use in chemical vapor deposition processes, and its method of manufacture are disclosed. A first torch body portion is formed having a manifold cavity with one side open. A number of tubes extend from passages formed in a torch face plate through the first manifold cavity. A first liquid material (such as wax) is poured into the cavity, such that its upper surface defines the desired inside wall surface of the first manifold corresponding to the open side. This material is allowed to harden. A second liquid material (such as epoxy) is then poured over the first material, and hardens to form the remaining wall of the first manifold cavity and to seal the tubes to the torch body portion. The first material is then removed, providing a torch body portion having a manifold with tubes extending through it. A second manifold may then be assembled to the first torch body portion to provide connection to the tubes.

In a particularly preferred embodiment, the first tip body portion may contain a further passageway for receiving a fluted tube to define additional passageways for the supply of additional unmixed materials to the vicinity of the flame.

10 Claims, 2 Drawing Sheets

METHOD OF MANUFACTURING A CVD TORCH

FIELD OF THE INVENTION

This invention relates to a torch for mixing and burning oxidant and fuel gases. More particularly, this invention relates to a method of manufacture of a torch for burning a fuel gas in an oxidant gas, in which the mixing of the oxidant and fuel gases takes place external to the torch and to the torch so manufactured. Such a torch is particularly useful in connection with chemical vapor deposition (CVD) techniques.

BACKGROUND OF THE INVENTION

It is known that in some cases it is desirable to mix a fuel gas to be burned with an oxidant external to the torch. For example, in U.S. Pat. No. 3,204,682 to Teleshefsky et al, a torch is shown which is suitable for this purpose. The Teleshefsky et al torch comprises a body portion 4 having a torch face plate portion 5. A number of gas tubes 17 are welded or soldered into a plate 9 separating first and second manifolds 10 and 13. The tips of the gas tubes 17 extend through holes 18 in the torch face plate 5. The holes 18 are broached to provide spaced annular passages 20 around the tubes 17, such that the annular passages extend from the manifold 13 to the exterior surface of the torch face plate 5, and the tubes 17 extend from the first manifold 10 through the second manifold 13 and to the exterior surface of the torch face plate 5.

As described in the Teleshefsky et al patent, the torch assembly is made entirely of metal, and the tubes 17 are preferably silver-soldered to the plate 9 separating the first and second manifolds. This assembly is then assembled to the torch body portion 4. In order that this assembly can be made, the alignment of the ends of the tubes 17 to be received in the holes 18 drilled in the face plate 5 is critical. Such a torch might be difficult to manufacture. Moreover, the Teleshefsky et al torch requires that the oxidant and fuel gases be supplied in concentric passages; this is not always desirable, and places a significant constraint on the flame pattern.

It is sometimes additionally desirable to supply materials other than the oxidant and fuel gases to the vicinity of the flame. The Teleshefsky et al patent teaches no method of supplying such additional materials to the flame for deposition or any other purpose.

SUMMARY OF THE INVENTION

Accordingly, it is an object of the invention to provide an improved torch for mixing of oxidant and fuel gases external to the torch which is more readily and economically manufacturable than that shown in the Teleshefsky et al patent, and which does not restrict the designer's choice of the pattern of delivery of the fuel and oxidant gases.

It is a further object of the invention to provide a method of manufacture of a torch as above, and which additionally allows supply of one or more additional chemicals to the vicinity of the flame without requiring mixture of the chemicals with one another or with either the oxidant gas or the fuel gas prior to their supply to the flame.

The above objects of the invention and others which will become apparent from the following description thereof are achieved by the method of manufacture of a torch according to the invention, in which a first torch body member is formed defining a first manifold cavity having one open side. A face plate of the body member opposite the open side of the manifold has a number of passageways formed therein. Gas tubes are inserted into some of the passageways, and extend through the first manifold cavity. A first material, for example, a liquid is then poured into the cavity to a degree that its upper surface corresponds to the desired inner surface of a membrane to be formed closing off the open wall of the manifold cavity. The first liquid is then allowed to harden. A second liquid is then poured over the hardened first liquid, and extends around the tubes. The second liquid is allowed to harden, forming a membrane sealing the tubes to the wall of the manifold cavity in the first torch body portion, and closing off the first manifold. The first liquid is then reliquefied and removed, leaving behind a first manifold through which the tubes extend. A second manifold is then assembled around the ends of the tubes extending through the hardened membrane.

The torch may include a central cylindrical passageway for receiving a fluted tube. The fluted tube has a central passageway for the supply of a first material to the vicinity of the flame, while passageways formed between the flutes and the cylindrical passageway form additional passageways through which one or more additional materials may be supplied to the vicinity of the flame without mixing with the first material prior to their supply to the vicinity of the flame.

BRIEF DESCRIPTION OF THE DRAWINGS

The invention will be better understood if reference is made to the accompanying drawings, in which.

DESCRIPTION OF THE PREFERRED EMBODIMENTS

Figure 1:
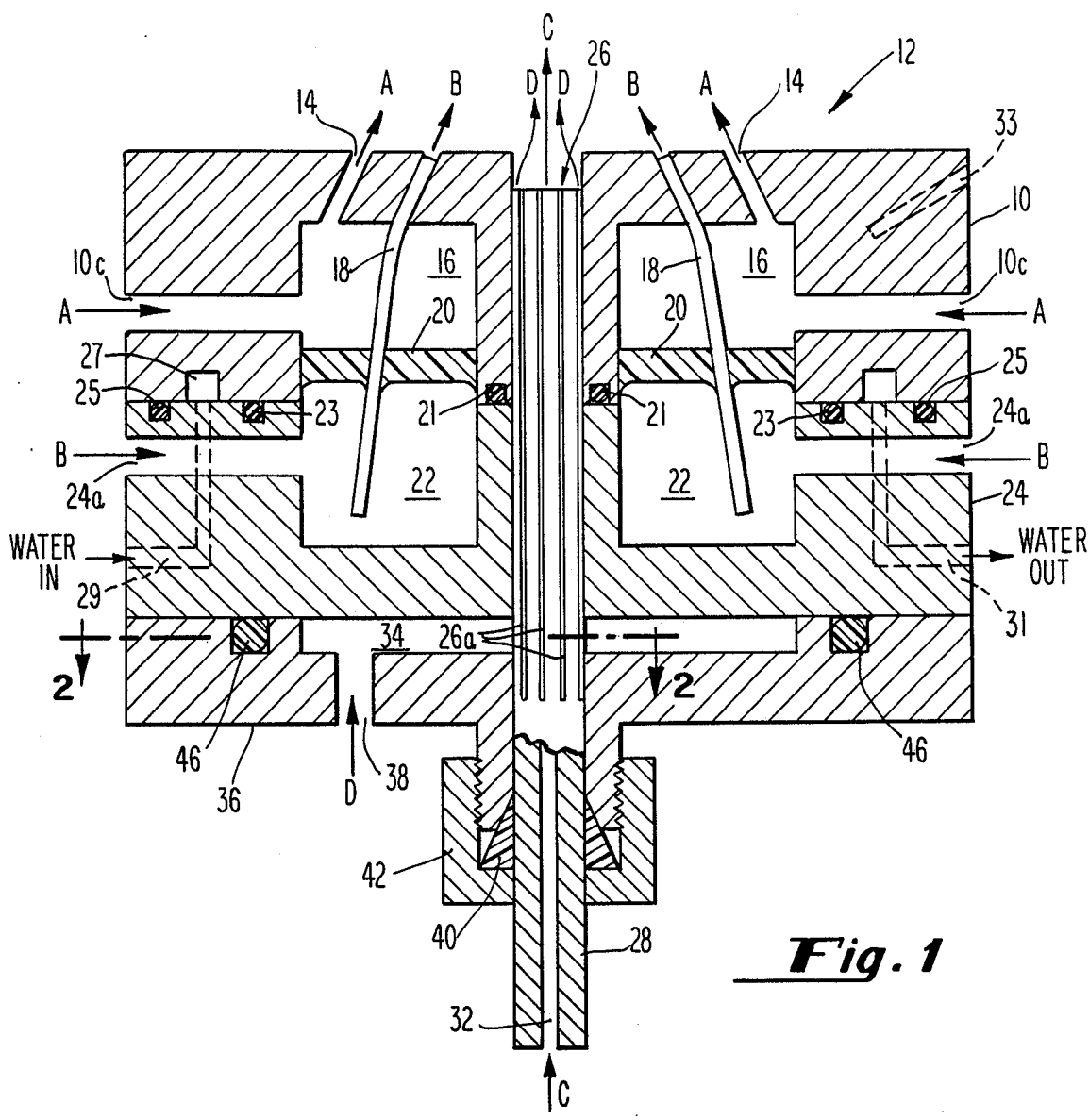
FIG. 1 shows a cross-sectional view of the overall torch assembly according to the invention.
Figure 2:
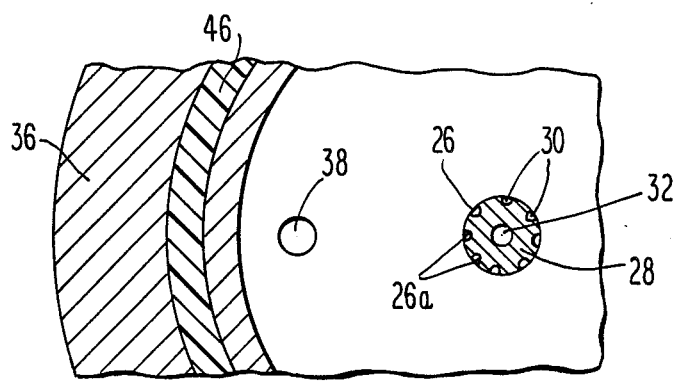
FIG. 2 is a partial cross-sectional view taken along the line 2—2 of FIG. 1.

FIG. 1 shows a cross-sectional view of the overall torch assembly, while FIG. 2 is a cross-sectional view taken along the line 2—2 of FIG. 1.

As can be seen in FIG. 1, the torch assembly comprises a first torch body portion 10, which comprises a torch face plate indicated generally at 12. A number of passageways 14 extend from the outer surface of the face plate 12 through it and into a first manifold 16. A number of tubes 18 extend from some of the passageways 14 in the face plate 12 through a membrane 20 and into a second manifold 22. The second manifold 22 is defined by a cavity in a second torch body portion 24 and by membrane 20. Second body portion 24 is sealed to the first body portion 10 by means of O-rings or equivalent seal devices 21, 23 and 25. A fuel gas A such as hydrogen may be supplied through openings 10c extending into the first manifold 16, and an oxidant B such as air or oxygen may be supplied through second openings 24a extending into the second manifold 22.

The fuel gas A then flows out by way of holes 14 in the face plate 12 into the vicinity of the torch face plate 12, and is mixed and combusted with the oxidant B, flowing from manifold 22 via tubes 18 to the vicinity of the torch face plate 12. Accordingly, the fuel gas A and oxidant B mix only externally to the torch, that is, outside the face plate 12. Cooling water may be supplied to a cooling water passage 27 in the first body portion 10 via an inlet port 29 in the second body portion 24, and removed therefrom via an outlet port 31. A temperature sensor may be disposed in a recess 33 in the first body portion 10.

According to a further aspect of the invention, the first and second torch tip body members 10 and 24 may be generally circular, as shown in FIG. 2. A cylindrical passageway 26 can be formed extending through body members 10 and 24 for receiving a fluted tube 28. Flutes 30 formed on the exterior surface of the tube 28 cooperate with the cylindrical passageway 26 formed in the first and second torch tip body 10 and 24 to define a number of additional passageways 26a for the supply of a chemical D to the vicinity of the flame formed external to the torch tip face plate 12. A second chemical C may be supplied to the flame via the central passageway 32 formed in the tube 28.

The passageways 26a formed between the cooperating flutes 30 of the tube 28 and the central passageway 26 in the torch body portions 10 and 24 may communicate with a third manifold 34 formed by a recess in a third body portion 36 (as shown) or in the second body portion 24, such that a gas or other chemical D supplied to a passageway 38 in the third body portion 36 may be supplied to all the passageways 26a.

As shown in FIG. 1, the flutes 30 may be terminated at or after the manifold 34, such that the tube 28 can be sealed to the third body portion 36 by means of a compressible resilient seal member 40, which is compressed into the third body portion by a cap member 42. The third body portion 36 can be sealed to second body portion 24 by a further O-ring 46 as indicated. Screws or the like (not shown) extending from the first body portion 10 through the second body portion 24 and into the third body portion 36 may be employed to hold this assembly together permanently.

Figure 3:
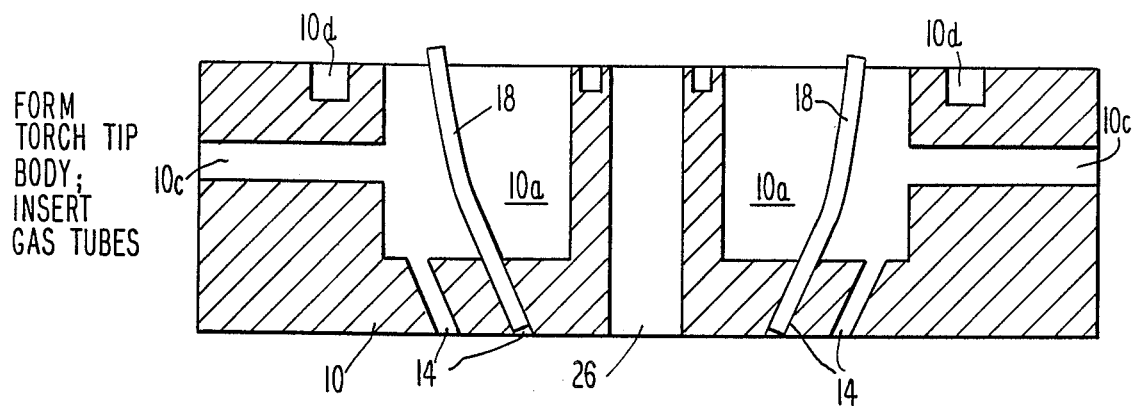
FIG. 3 shows a cross-sectional view of a first torch body member in a first stage of manufacture, having had the gas tubes inserted in holes extending through the face plate thereof.
Figure 4:
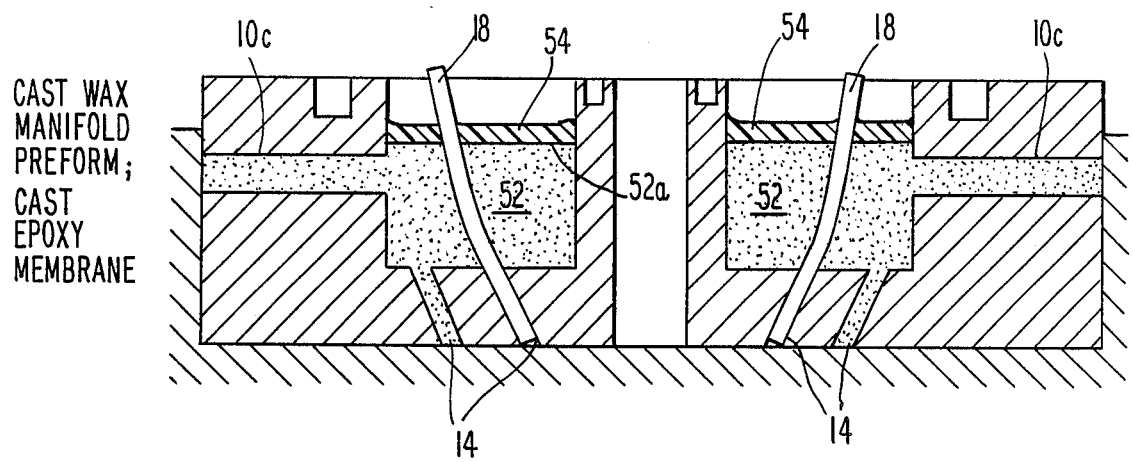
FIG. 4 shows a subsequent stage in manufacture of the first torch body member according to the invention, after casting of the first and second liquids.
Figure 5:
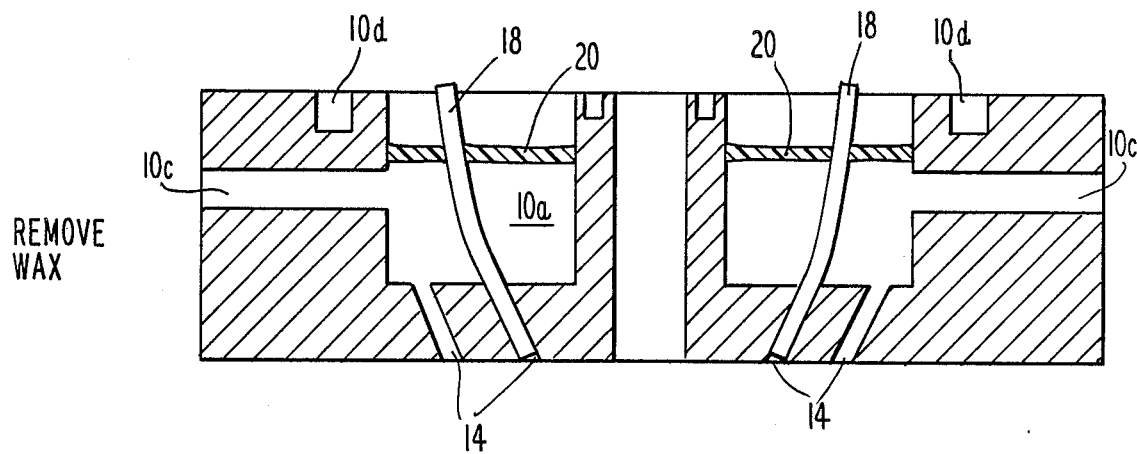
FIG. 5 shows the first torch body member when complete, after the first liquid has been removed.

FIGS. 3-5 show stages in the manufacture of the first tip body portion 10. FIG. 3 shows the basic tip body portion. As can be observed, the tip body portion has formed in it a central passageway 26 for receiving the fluted tube 28, and also has an annular first manifold cavity 10a formed therein. A number of passageways 14 extend from the first manifold cavity 10a to the face plate portion 12 of the tip body member 10. A number of tubes 18 are inserted into a like number of the passageways 14 in the face plate portion 12 of the first tip body portion 10. One or more gas passageways 10c extend into the manifold cavity 10a. A water coolant groove 27 may also be formed in the tip body portion 10.

FIG. 4 shows the subsequent stage in the manufacture of the first tip body portion 10. A quantity of a liquid 52, which may be molten wax, is then poured into the manifold cavity 10a. In order to prevent escape of the molten wax, the passage ways 10c and 14 are plugged up. For example, the tip body portion 10 may be placed in a recess in a block 50 into which it fits snugly. The quantity of wax is selected such that its upper surface 52a corresponds to the desired shape of the membrane separating manifolds 16 and 22 which is to be formed. The wax 52 typically fills those passageways 14 in the face plate 12 which have not had tubes 18 inserted therein, and will also extend into the further passageways 10c, as indicated. The wax 52 is then allowed to harden.

After the wax 52 has hardened, a second liquid material 54, typically a hardening epoxy resin/hardener mixture, is poured into the manifold cavity 10a, over the wax 52. The second liquid material 54 is permitted to harden, sealing the tubes 18 to the inner wall surfaces of the manifold 16. When the second liquid material 54 has hardened, it forms the membrane 20 between the first and second manifolds 16 and 22 (FIG. 1).

A second liquid material 54 should be selected which does not shrink substantially upon hardening, so that it seals the tubes 18 to one another effectively and forms a leakproof membrane upon hardening, and which does not liquefy under the same conditions as the first liquid material 52, so that the first material 52 can be reliquefied without disturbance of the hardened second material 54.

FIG. 5 shows the last stage in manufacture of the first tip body portion 10. In this stage, the first liquid material is reliquefied and removed. For example, if wax is used as the first liquid material, tip body portion 10 is simply warmed, such that the wax 52 melts and runs out of the unplugged passageways 14 and 10c. The assembly shown in FIG. 5 remains. As shown, the membrane 20 seals the tubes 18 to the inner surface of first manifold cavity 10a and also separates the first manifold 16 from the second manifold 22 (FIG. 1).

The second and third body portions 24 and 36 can now be assembled to the first body portion 10, and the fluted tube 28 inserted through the central passageway 26, completing the assembly of the torch tip according to the invention.

While a preferred embodiment of the invention has been shown and described, it will be appreciated that there are additional modifications and improvements that can be made thereto without departure from its essential spirit and scope. In particular, a first powder material could be substituted for the liquid wax, and a second highly viscous material for the epoxy; so long as they did not mix, and the first material could be removed without disturbance of the second, the method of the invention would be practical. Similarly, the first material could be removed by a solvent or other means not necessarily requiring heating. Accordingly, the recitations made in the following claims are to be accorded a substantial range of equivalents, and the invention is not to be limited by the above exemplary disclosure.

I claim:

1. Method for manufacture of a torch for mixing of oxidant and fuel gases externally to said torch, comprising the steps of:

forming a first torch body portion, said first body portion having a first manifold cavity formed therein having one open side, and said first body portion comprising a torch face plate, said torch face plate having a plurality of passageways formed therethrough, extending from said first manifold cavity to an external surface of said torch face plate;

assembling to said torch face plate a number of gas tubes less than the number of said plurality of passageways, each said gas tube terminating at one end in one of said passageways in said torch face plate and extending from said face plate through and beyond said first manifold cavity;

pouring an amount of a first material into said first cavity, the amount of such material being such that the upper surface of said material coincides with a desired surface of said first manifold corresponding to said open side of said first manifold cavity in said first tip body portion;

pouring an amount of a second material, which does not mix with said first material and which is not susceptible to removal under certain conditions which would remove the first material, over said first material, and around said gas tubes;

causing said second material to harden, such that said hardened second material forms a wall of said first manifold cavity and seals said at least one gas tube to said first tip body portion, and said gas tubes extend through the wall of said first manifold thus formed;

removing said first material without disturbance of said hardened second material; and providing means for supply of first and second gases to said gas tubes and to said first manifold.

2. The method of claim 1, wherein said gas passageways not having said gas tubes inserted thereinto are formed prior to said step of pouring a first liquid material into said first cavity.

3. The method of claim 1, wherein said means for supply of gas to said at least one gas tube comprises a second manifold into which the ends of said gas tubes not terminating at said torch face plate extend.

4. The method of claim 3 wherein said second manifold is formed by a second manifold cavity in said first tip body portion and a cover member.

5. The method of claim 4 wherein said second manifold cavity is separated from said first manifold cavity by a membrane consisting of said wall of said first manifold formed of said hardened second material.

6. The method of claim 1, comprising the further step of assembling an additional tube assembly to said first body portion, said additional tube assembly comprising one or more additional passageways for the separate supply of one or more additional materials to the vicinity of said face plate.

7. The method of claim 6, wherein said additional tube assembly comprises an externally fluted tube fitting within a cylindrical passageway formed in at least said first tip body portion, such that a first passageway for a first material extends down the center of the tube and one or more further passageways for further materials are formed between the flutes and the cylindrical passageway in at least the first tip body portion.

8. The method of claim 7, wherein plural flutes are formed in said externally fluted tube, and said cylindrical passageway in at least said first tip body portion communicates with a further manifold by which the passageways formed by said plural flutes are in communication with one another.

9. The method of claim 1, wherein said first material is molten wax.

10. The method of claim 1, wherein said second liquid material is an epoxy resin/hardener mixture.

* * * * *

UNITED STATES PATENT AND TRADEMARK OFFICE
CERTIFICATE OF CORRECTION

PATENT NO. : 4,813,093
DATED : March 21, 1989
INVENTOR(S) : Philip S. Levin

It is certified that error appears in the above-identified patent and that said Letters Patent is hereby corrected as shown below: On the title page:

The issued patent should include the following list:

-- References Cited

U.S. PATENT DOCUMENTS

| | | | |
|---|---|---|---|
| 904,243 | 11/1908 | Bennett | ................... |
| 2,868,587 | 1/1959 | Hegmann | 299/140 |
| 3,171,599 | 3/1965 | Rotolico | 239/85 |
| 3,204,682 | 9/1965 | Teleshefsk et al. | 158/27.4 |
| 3,617,224 | 11/1971 | Tsekhovoi et al. | 23/284 |
| 4,575,609 | 3/1986 | Fassel et al. | 219/121 PV -- |

Signed and Sealed this

Eighth Day of May, 1990

Attest:

HARRY F. MANBECK, JR.

*Attesting Officer*  *Commissioner of Patents and Trademarks*